United States Patent
Khanna et al.

(10) Patent No.: US 8,661,295 B1
(45) Date of Patent: Feb. 25, 2014

(54) MONITORING AND DETECTING CAUSES OF FAILURES OF NETWORK PATHS

(75) Inventors: Richendra Khanna, Seattle, WA (US); Edward L. Wallace, Bellevue, WA (US); Jagwinder Singh Brar, Bellevue, WA (US); Michael David Marr, Monroe, WA (US); Samuel J. McKelvie, Seattle, WA (US); Peter N. DeSantis, Seattle, WA (US); Ian P. Nowland, Seattle, WA (US); Matthew D. Klein, Seattle, WA (US); Justin Mason, Dublin (IE); Jacob Gabrielson, Seattle, WA (US)

(73) Assignee: Amazon Technologies, Inc., Reno, NV (US)

( * ) Notice: Subject to any disclaimer, the term of this patent is extended or adjusted under 35 U.S.C. 154(b) by 110 days.

(21) Appl. No.: 13/077,296

(22) Filed: Mar. 31, 2011

(51) Int. Cl.
*G06F 11/00* (2006.01)

(52) U.S. Cl.
USPC .......................................................... 714/43

(58) Field of Classification Search
USPC .......................................................... 714/43
See application file for complete search history.

(56) References Cited

U.S. PATENT DOCUMENTS

| | | | | |
|---|---|---|---|---|
| 5,864,662 A * | 1/1999 | Brownmiller et al. | .......... | 714/43 |
| 6,654,914 B1 * | 11/2003 | Kaffine et al. | .................. | 714/43 |
| 6,671,818 B1 * | 12/2003 | Mikurak | ...................... | 714/4.21 |
| 6,694,455 B1 * | 2/2004 | Scrandis et al. | ................ | 714/31 |
| 6,738,933 B2 * | 5/2004 | Fraenkel et al. | ............. | 714/47.2 |
| 6,823,479 B1 * | 11/2004 | McElhaney et al. | ............ | 714/43 |
| 6,901,530 B2 * | 5/2005 | Cerami et al. | ................. | 714/4.3 |
| 6,909,741 B1 * | 6/2005 | Smith et al. | .................... | 375/222 |
| 6,978,302 B1 * | 12/2005 | Chisholm et al. | ............. | 709/224 |
| 6,981,039 B2 * | 12/2005 | Cerami et al. | ................ | 709/223 |
| 7,134,135 B2 * | 11/2006 | Cerami et al. | ................ | 725/105 |
| 7,251,055 B2 * | 7/2007 | Sawada et al. | ................ | 358/1.9 |
| 7,385,924 B1 * | 6/2008 | Riddle | ......................... | 370/235 |
| 7,441,154 B2 * | 10/2008 | Klotz et al. | ..................... | 714/39 |
| 7,546,609 B2 * | 6/2009 | Florissi et al. | ................ | 719/318 |
| 7,706,373 B2 * | 4/2010 | Xu et al. | ....................... | 370/392 |
| 7,751,350 B1 * | 7/2010 | Pabst | ............................ | 370/285 |
| 7,788,536 B1 * | 8/2010 | Qureshi et al. | ............. | 714/38.14 |
| 7,936,694 B2 * | 5/2011 | Choudhury | .................... | 370/252 |
| 7,953,020 B2 * | 5/2011 | Breslau et al. | ............... | 370/252 |
| 8,223,655 B2 | 7/2012 | Heinz et al. | | |
| 8,300,554 B1 * | 10/2012 | Vijendra et al. | ............. | 370/254 |
| 8,375,244 B2 * | 2/2013 | Bobak et al. | ...................... | 714/3 |
| 8,433,894 B2 * | 4/2013 | Reznik et al. | ................ | 713/151 |
| 2002/0010735 A1 * | 1/2002 | McMillen et al. | ............ | 709/201 |
| 2002/0016856 A1 * | 2/2002 | Tallegas et al. | ............... | 709/238 |
| 2005/0091361 A1 * | 4/2005 | Bernstein et al. | ............. | 709/223 |

(Continued)

*Primary Examiner* — Amine Riad
(74) *Attorney, Agent, or Firm* — Knobbe Martens Olson & Bear LLP

(57) ABSTRACT

Generally described, systems and methods are provided for monitoring and detecting causes of failures of network paths. The system collects performance information from a plurality of nodes and links in a network, aggregates the collected performance information across paths in the network, processes the aggregated performance information for detecting failures on the paths, analyzes each of the detected failures to determine at least one root cause, and initiates a remedial workflow for the at least one root cause determined. In some aspects, processing the aggregated information may include performing a statistical regression analysis or otherwise solving a set of equations for the performance indications on each of a plurality of paths. In another aspect, the system may also include an interface which makes available for display one or more of the network topology, the collected and aggregated performance information, and indications of the detected failures in the topology.

17 Claims, 8 Drawing Sheets

(56) References Cited

U.S. PATENT DOCUMENTS

| | | |
|---|---|---|
| 2005/0169185 A1 | 8/2005 | Qiu et al. |
| 2005/0210132 A1* | 9/2005 | Florissi et al. ................ 709/224 |
| 2009/0037771 A1* | 2/2009 | Morse et al. .................... 714/25 |
| 2009/0116404 A1* | 5/2009 | Mahop et al. ................. 370/254 |
| 2010/0157516 A1* | 6/2010 | Doorhy et al. ........... 361/679.02 |
| 2010/0278056 A1* | 11/2010 | Meloche et al. ............... 370/252 |
| 2011/0078291 A1* | 3/2011 | Bickson et al. ............... 709/221 |
| 2012/0182864 A1* | 7/2012 | Heinz et al. ................... 370/221 |
| 2012/0320784 A1 | 12/2012 | Edwards et al. |
| 2013/0070612 A1 | 3/2013 | Timus et al. |
| 2013/0117272 A1* | 5/2013 | Barga et al. ................... 707/741 |

\* cited by examiner

MONITORING AND DETECTING CAUSES OF FAILURES OF NETWORK PATHS

BACKGROUND

Computer networks generally comprise various interconnected computing devices that can exchange data. Computing devices in a computer network can be in direct communication with one or more other computing devices. Each direct communication connection between computing devices in a computer network is generally referred to as a network link or link. While a computer network is generally made up of a number of links, computing devices in a computer network do not typically include links to every other computing device in a computer network. Rather, data to be exchanged between computing devices can be subdivided into packets and propagated via the computer network to eventually reach an intended recipient, regardless of whether there is a direct link between the sender and recipient.

More specifically, packets of data are typically transmitted from an origin computing device to an identified destination computing device. If a packet of data is received by a computing device that is not the identified destination computing device, the receiving computing device becomes an intermediate in the communication path between the origin computing device and the destination computing device by forwarding the packet to another computing device in the computer network. Accordingly, each packet of data is transmitted through a series of intermediate links in the computer network until the packet reaches its destination computing device. The series of links for delivery of a packet of data between an origin computing device and a destination computing device is generally referred to as a network path or path.

At each computing device in a communication network, an independent decision may be made regarding the path to the identified destination computing device for each received data packet. Each computing device can use several factors for making the decision regarding the path to the identified decision. For example, in some networks, portions of the destination address included in the data packet may be used to compare to a lookup table on the computing device. Based on the independent decision, a receiving computing device transmits a received data packet on the next intermediate link in the path.

Indications of total traffic on any one link in the network may be obtained by measuring packets transmitted and/or received on the two computing devices connected by that link. However, as networks become increasingly complex, network operators may desire to obtain information regarding the performance of paths in the network, rather than indications of total traffic on individual links. The performance of paths in the network may include a view of the interconnection between all the computing devices in the network. Such a view is a closer approximation of what is experienced by a network user in terms of network performance. Performance of the paths may also include indications of dropped or lost packets, of service degradation, or even of a network halt due to excessive traffic.

Additionally, although there exist tools to detect when network outages occur, it may be difficult to find where the cause of failure lies in order to fix network related issues. Network path information allows network operators to isolate any network issues down to devices in the networks in order to take remedial action. Finally, in conventional systems, one or more hosts are dedicated to monitoring hundreds and even thousands of hosts. As the network becomes more complex, increasingly more hosts need to be dedicated to monitoring. Additionally, this type of monitoring simply provides an indication of responsive or non-responsive behavior from a host.

BRIEF DESCRIPTION OF THE DRAWINGS

The foregoing aspects and many of the attendant advantages will become more readily appreciated as the same become better understood by reference to the following detailed description, when taken in conjunction with the accompanying drawings, wherein.

DETAILED DESCRIPTION

Generally described, aspects of the present disclosure relate to systems and methods for monitoring and detecting causes of failures of network paths. As discussed above, existing systems may enable a determination of total traffic on any one link in the network by measuring packets transmitted or received by two computing devices corresponding to a network link. However, network operators would like to obtain information regarding the performance of paths in the network, rather than indications of total traffic on individual links. Once equipped with network path information, network operators may also desire to isolate any network issues down to devices and links in the networks in order to take remedial action. Aspects of the present disclosure enable continuous monitoring of network paths to determine anomalies in the various nodes and links in order to find causes of failures and remedy them as appropriate.

Specifically, in one aspect, the network path monitoring and cause of failure detection system collects performance information from a plurality of nodes and links in a network, aggregates the collected performance information across paths in the network, processes the aggregated performance information for detecting failures on the paths, analyzes each of the detected failures to determine at least one root cause for each of the failures, and remedies the at least one root cause determined. In some aspects, processing the aggregated information may include solving a set of equations for the performance indications on each of a plurality of paths in the network. In another aspect, the system may also include an interface which makes available for display one or more of the network topologies, the collected and aggregated performance information, and indications of the detected failures in the one or more topologies.

Although various aspects of the disclosure will be described with regard to illustrative examples and embodiments, one skilled in the art will appreciate that the disclosed embodiments and examples should not be construed as limiting.

Figure 1:
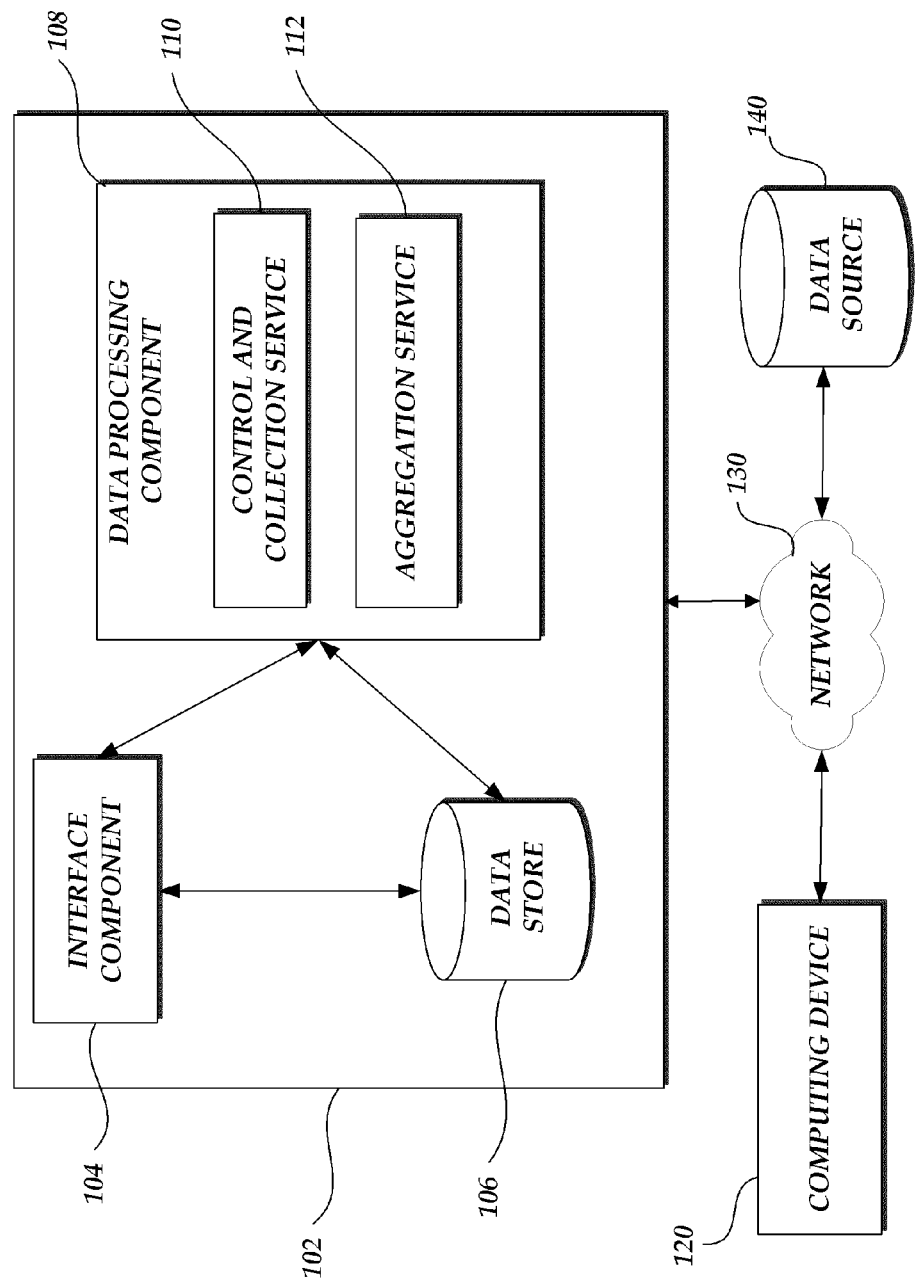
FIG. 1 is a block diagram depicting an illustrative embodiment of a computing environment implementing a network path monitoring and cause of failure detection system.

FIG. 1 is a block diagram depicting an illustrative embodiment of a computing environment 100 implementing a network path monitoring and cause of failure detection system 102. The network path monitoring and cause of failure detection system 102 includes a data store 106, an interface component 104, and a data processing component 108. The data processing component 108 includes a control and collection service 110, and an aggregation service 112. The depicted environment 100 also includes a client computing device 120 communicatively connected by a network 130, such as the Internet. Those skilled in the art will recognize that the client computing device 120 may be any of a number of computing devices that are capable of communicating over a network including, but not limited to, a data center server, workstation, laptop, personal computer, tablet computer, electronic book reader, personal digital assistant (PDA), hybrid PDA/mobile phone, mobile phone, and the like. In some embodiments, the client computing device 120 may include computer hardware and software components. The computing environment 100 may also include one or several data sources 140 that may be external to the failure detection system 102. The computing environment 100 may also be collaborating with other network management systems in various data centers.

Illustratively, the network path monitoring and cause of failure detection system 102 may control and collect information from various nodes in network 130 through the control and collection service 110. The network path monitoring and cause of failure detection system 102 may also aggregate the information collected through the aggregation service 112. In various embodiments, the information collected may include paths taken between nodes in the network, as well as performance indices along the various paths. The performance indices may include latency, dropped packets, bandwidth of links, and the like. Using the information collected and aggregated, the data processing component 108 may create a network topology which may be made available to be displayed on a client computing device 120 through the interface component 104. The data processing component 108 may also use information received from one or more external data source 140. The data processing component 108 may also store information collected and aggregated into the data store 106 for later retrieval and use.

Figure 2A:
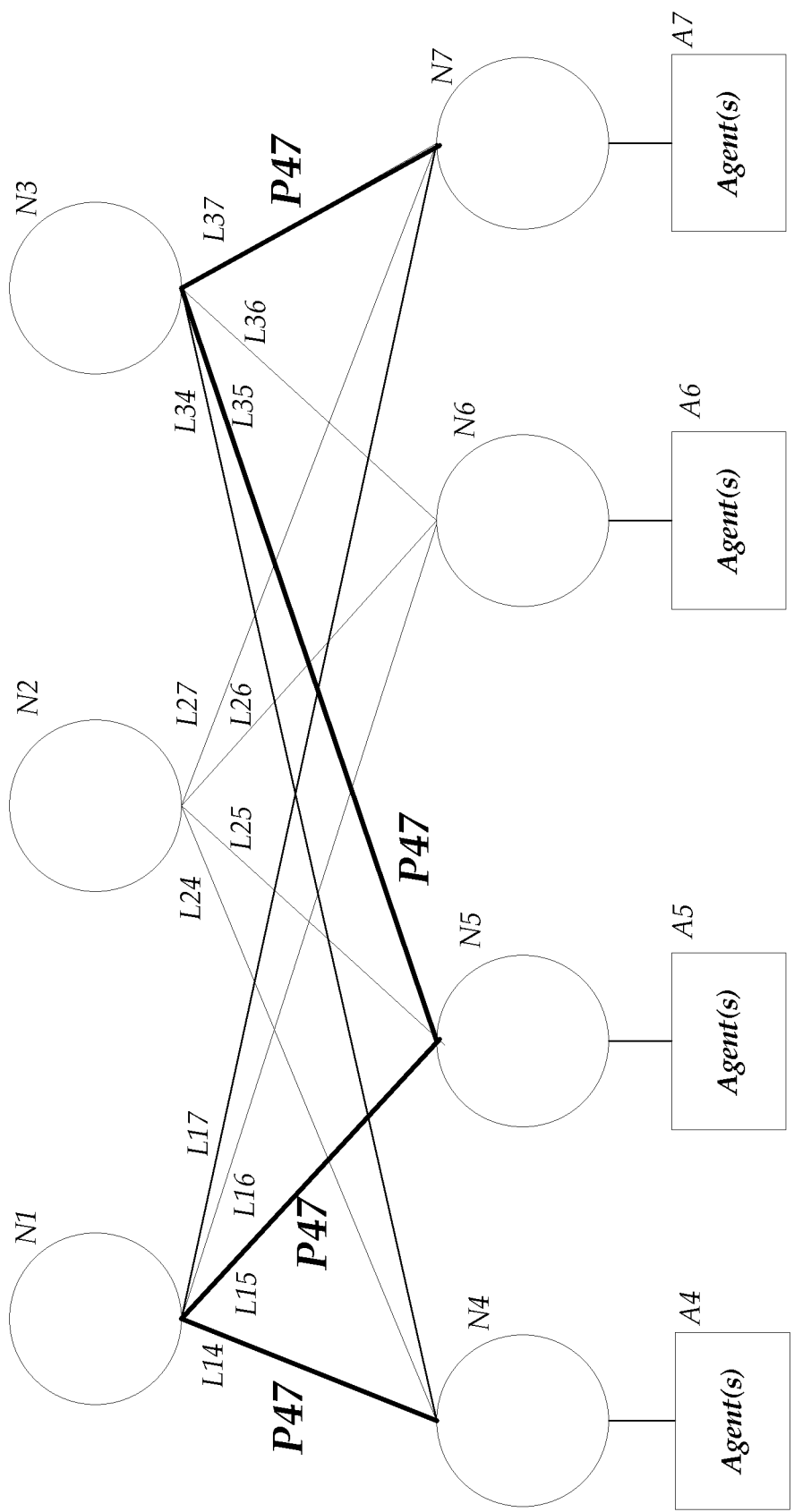
FIGS. 2A and 2B are schematic diagrams of an illustrative network topology defining various nodes, links and paths.
Figure 2B:
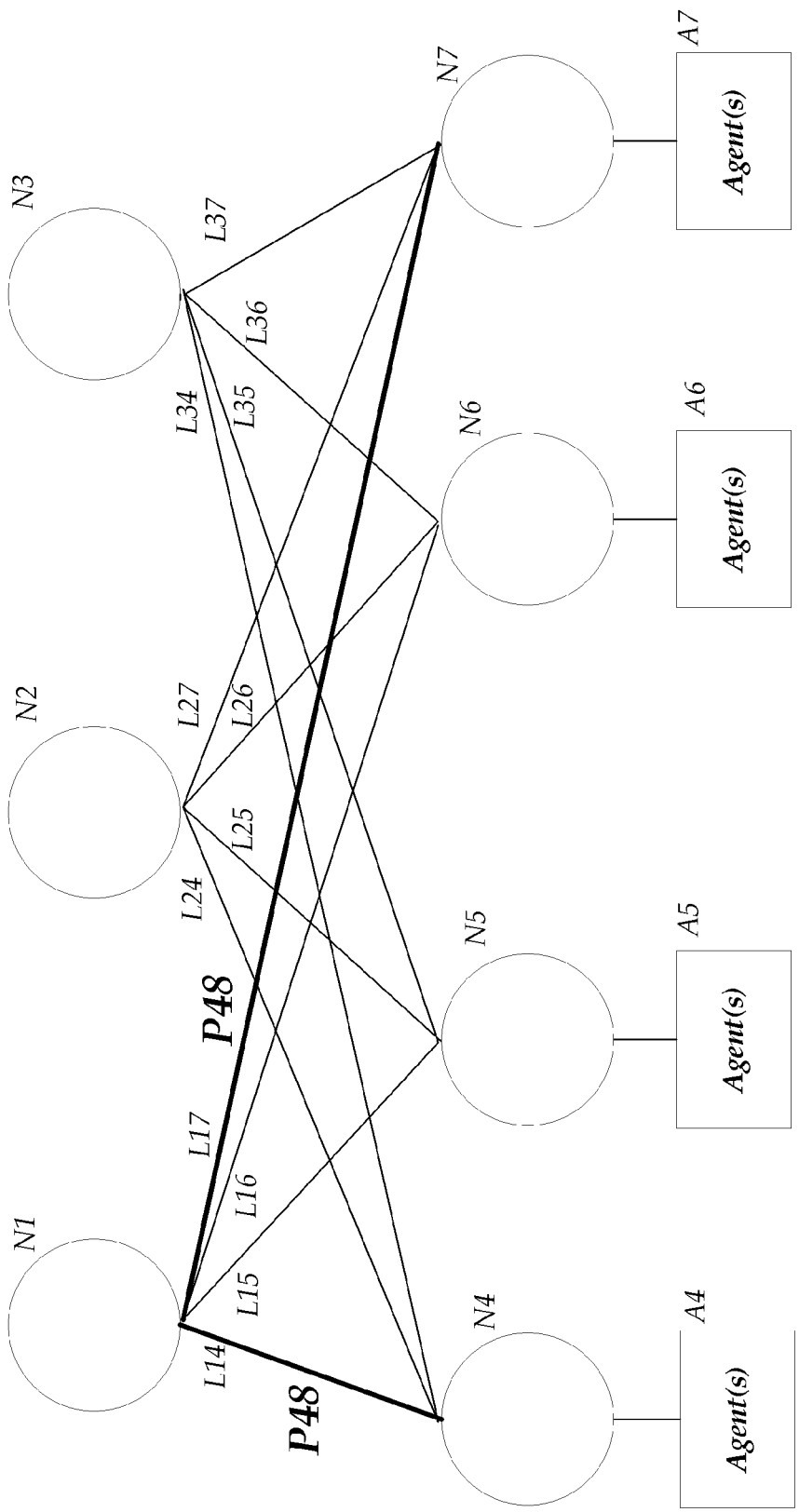

FIGS. 2A and 2B are schematic diagrams of nodes, links and paths in an illustrative network. FIG. 2A illustrates nodes N1-N7, links L14-L17, L24-L27, and L34-L37, and path 47. As indicated, a direct connection between a pair of nodes consists of a link. The connection may include additional hardware components, but is considered direct for the purposes of this disclosure. Illustratively, nodes N1 and N4 are interconnected by link L14. Similarly, nodes N1 and N5 are interconnected by link L15. In accordance with FIG. 2A, communications of data involves sending individual packets of data from an origin node to a destination node. A packet sent from an origin node to a destination node which is more than one link away from the origin node follows a path consisting of several links. For illustrative purposes, a packet from node N4 to node N7 may follow a path P47. Path P47 illustrated in FIG. 2A includes links L14, L15, L35, and L37.

Illustratively, the origin node does not specify the path in which a packet may or must travel. Rather, if a receiving node is not the destination node (e.g., an intermediary node), the receiving node obtains a packet and transmits the packet to another node via a selected link. Accordingly, the results of each intermediary node forwarding a packet defines the path which the packet takes. As such, the same intermediary node may forward successive packets along different links, which would result in the successive packets being forwarded to the destination node along different paths based on the selection of the link the intermediary node. With reference to FIG. 2B, another packet transmitted between node N4 and N7 may follow a path P48 including links L14 and L17.

One skilled in the relevant art will appreciate that networks monitored by the network path monitoring and cause of failure detection system 102 may include several more nodes than the illustrative network shown in FIGS. 2A and 2B. Accordingly, the number of potential paths and links between paths can vary greatly accordingly to the configuration of the nodes, generally referred to as the network topology.

FIGS. 2A and 2B also illustrate agents A4-A7 associated with nodes N4-N7. Each of the nodes in the network may be associated with an agent. The agent may be on the same device as the node, or on a separate device. In various aspects, the network path monitoring and cause of failure detection system 102 selects certain nodes in the network 130 to act as transmitters of messages to other nodes in the network 130 in order to test the reachability of those other nodes. The messages sent to the other nodes may consist of content-less messages. In some embodiments, the transmitters may use User Datagram Protocol (UDP) packets to send the content-less messages. In other embodiments, Transmission Control Protocol (TCP), Internet Control Message Protocol (ICMP), Infiniband (IB), or other types of packets may be used. The agent associated with each of the nodes may be used to transmit the content-less messages, to respond to the messages sent from transmitters, and also to collect responses received. The network path monitoring and cause of failure detection system 102 may then measure the round-trip time for messages sent from the transmitting nodes based on the response received from the agents.

Figure 3:
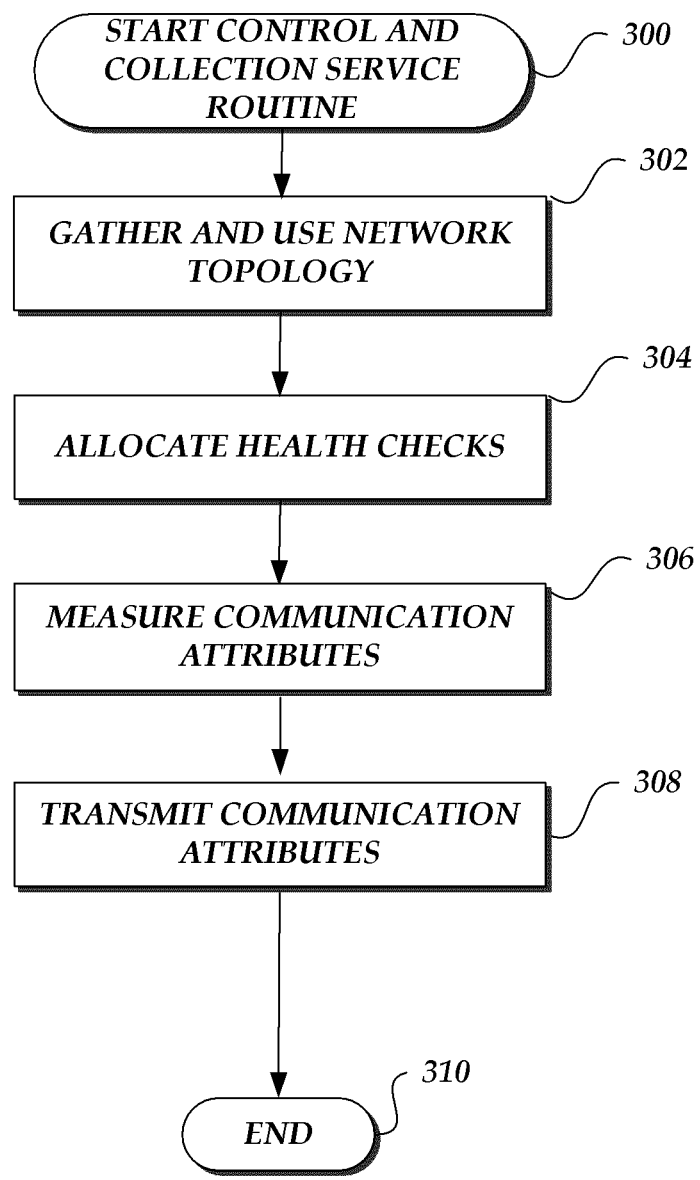
FIG. 3 is a flow diagram depicting an illustrative routine for controlling and collecting information from nodes in a network.

FIG. 3 is a flow diagram depicting an illustrative routine 300 for controlling and collecting information from nodes in a network. One skilled in the relevant art will appreciate that actions/steps outlined for routine 300 may be implemented by one or many computing devices/components that are associated with the control and collection service 110 of the data processing component 108. Accordingly, the routine has been logically associated as being generally performed by the control and collection service 110 of the data processing component 108, and thus the following illustrative embodiments would not be considered as limiting.

At block 302, the topology of the network is gathered and verified, in order to be used for allocation decisions as well as in failure detection, as described further in connection with the routines 400 and 500 illustrated in FIGS. 4 and 5 below. Illustratively, the transmitters measure the route path and communication attributes through the network. Communication attributes may include various measurements such as, for example, transit times of packets sent through the network. In order to determine whether there are any remaining paths for which data needs to be gathered, a rough knowledge of the network topology may be used. The rough knowledge of the topology may be based on diagrams provided by network technicians. The diagrams provided may also be associated with various confidence levels. The rough knowledge of the topology may also be based on a knowledge of the workflow of the build process for the network. For example, it may be known that the network was initially designed with a 100 nodes, and there was a planned expansion of a doubling of nodes in a given timeframe within a given geographic area. The topology may also be inferred from a combination of external sources, such as configuration files, technicians' information, automated switch building, subnet analysis, SNMP query information regarding run-time configuration states of devices, or other monitoring services. The topology of the network is gathered and stored. The topology may also be periodically validated to ensure it is up to date, and updated as necessary. Any topology changes observed may be used to trigger reallocation of health checks at block 304 described below. The topology gathered may be made available for display.

At block 304, health checks are allocated across the links in the network. It is desired to not overload links in the network with health checks. However, a minimum number of health checks across the network are necessary for adequate monitoring of the network. The frequency of health checks may be set and adjusted in various ways. The frequency may be static, it may be manually adjusted, or it may also be dynamically adjusted based on business logic. The frequency of health checks may also be adjusted based on topology changes observed in block 302, based on frequency of such topology changes, as well as based on whether faults are detected at block 406 described below. As described above, a path includes source and destination nodes, and a series of intermediate nodes and links between the nodes. Packets arriving at a node may await transmission to the next node according to the packet's protocol as handled by the node. If the memory of the node is full when a packet arrives, the packet may be discarded. Otherwise, the packet is held until it reaches the front of the queue and is then forwarded to the next node on the way to its destination. This waiting mechanism may be responsible for observed packet losses and for packet latencies. Other reasons may also contribute to packet losses and/or latencies.

The ping utility may be used to check if a remote computing device is operating and to determine network connectivity. The source computing device may send an Internet Control Message Protocol (ICMP) packet to the remote computing device's IP address. If the destination computing device is up and the network connections are fine, the source computing device may receive a return an ICMP packet. Thus, one can collect data on roundtrip times and delays using the ping utility. Using other packet protocols, including for example TCP, UDP, and the like, may have different advantages and may be used in various embodiments. In some embodiments, transmitting a message with UDP packets instead of ICMP packets provides the added advantage of being able to manipulate paths between two endpoints. The manipulation of paths between the two endpoints may be achieved by manipulating port numbers. For example, the manipulation of paths may be achieved in accordance with flow preserving next-hop packet forwarding protocols such as Equal Cost Multi-Path (ECMP). With ECMP, and similar flow preserving packet forwarding strategies, at each node in the network, the decision on which path to take to send a packet to the destination computing device is done independently, and is deterministically dependent on the source port number, the destination port number, the source IP address and the destination IP address. The use of UDP packets by the transmitters of the network path monitoring and cause of failure detection system 102 allows the packets to be re-routed as necessary to a path for which data needs to be gathered. The re-routing is enabled by manipulation of port numbers. Each node learns and takes a default flow through the nodes in the network to arrive at a given destination. By manipulating the destination port through the use of UDP packets, the intermediate packet forwarding devices can be forced into taking a different, desired path. Therefore, in the network path monitoring and cause of failure detection system 102, each link is covered by a sufficient number of paths in order to identify a failing link from a set of failing paths. The various paths covering a link may be achieved by using one or more of the transmitters. Block 304 is described in further detail in connection with the routine 600 illustrated in FIG. 6.

At block 306, the communication attributes across the network are measured. The communication attributes may be measured on one-way or on round-trip paths. Since the different paths of the network are discovered during topology gathering at block 302, the route followed by a data packet is known based on the combination of the source IP and port and destination IP and port used in the packet. The time taken to send and receive the packet is recorded by the data control and collection service 110.

In an illustrative embodiment, paths are discovered by sending UDP packets from the source to a destination, and received back at the source from the destination. The time-to-live (TTL) field of a packet may be exploited to determine the path that the packet takes to its destination. IP packets typically have a TTL field that can take on values between 0 and 255. When a node receives an IP packet, it may decrement this TTL field and forward the packet to its destination according to the node's routing table. If, however, the TTL field was already 0, the node may send back a packet, indicating TTL exceeded, to the source.

The UDP packets may be sent at increasing values of TTL, starting with 1, until the destination is actually reached. The source may send a UDP packet to some invalid port at the destination. When the destination receives a packet destined for an invalid port, a packet indicating "Port unreachable" may be sent back to the source to indicate the error. The source then knows the destination was reached. All the previous packets failed to reach the destination because the TTL was too small and the source received a TTL exceeded message from each of the intervening nodes between the source and the destination, in the order in which they appear. The rate of frequency for discovering and verifying paths is centrally scheduled by the data control and collection service 110. The frequency may be the same for all nodes in the network, or it may be adjusted according to the load on each node. At block 308, the communication attributes measured and recorded are transmitted to the aggregation service 112 and/or the data store 106 and the interface component 104 of the network path monitoring and cause of failure detection system 102.

Figure 4:
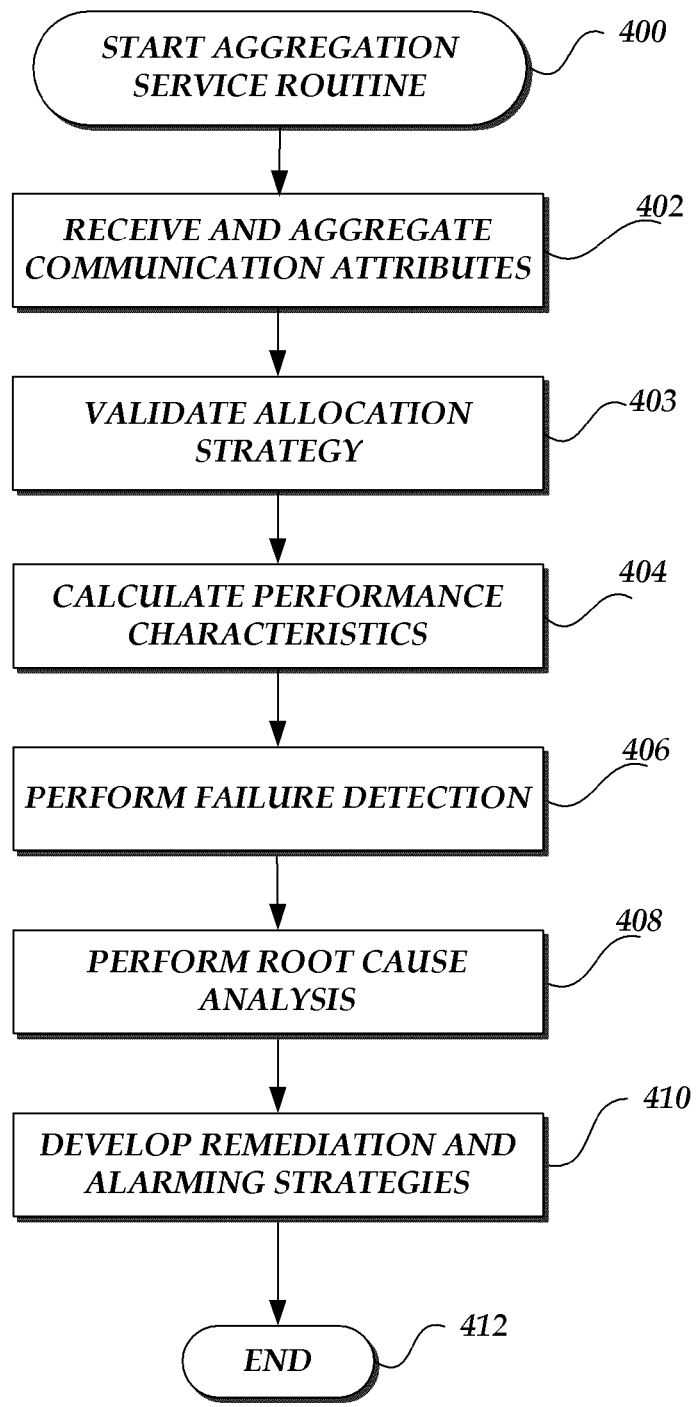
FIG. 4 is a flow diagram depicting an illustrative routine for aggregating information collected from nodes in a network.

FIG. 4 is a flow diagram depicting an illustrative routine 400 for aggregating information collected from nodes in a network. One skilled in the relevant art will appreciate that actions/steps outlined for routine 400 may be implemented by one or many computing devices/components that are associated with the aggregation service 112 of the data processing component 108 of the network path monitoring and cause of failure detection system 102. Accordingly, the routine has been logically associated as being generally performed by the aggregation service 112 of the data processing component 108, and thus the following illustrative embodiments would not be considered as limiting.

At block 402, the communication attributes collected by the control and collection service 110 are received by the aggregation service 112. The communication attributes collected by each of the selected nodes are aggregated. Aggregation of the communication attributes enables reliable detection of failing paths. Data collected across several paths crossing the same node through different links and/or through packets sent from different transmitter nodes are aggregated.

At block 403, the communication attributes collected are used to determine whether the allocation strategy adopted is appropriate. The allocation strategy aims to provide adequate coverage of all the paths in the network. The communication attributes collected may indicate a need to adjust the allocation strategy in order to collect more path information. The health check frequency may thus be increased in some scenarios. In some scenarios, new paths may be allocated to one or more different agents on the networks. Additionally, a determination of inadequate coverage of network paths may trigger an alarm at block 410. Block 302 of the control and collection service routine 300 may also be repeated if the allocation strategy is deemed to not be appropriate at block 403.

At block 404, using the communication attributes aggregated, the aggregation service calculates performance characteristics of the nodes and links in the network, using the network topology gathered at block 302 of the control and collection service routine 300. Performance characteristics may include indications of packet loss, latency, throughput, jitter and the like. The aggregation service 112 may store the information collected and aggregated in a data store such as data store 106 illustrated in FIG. 1. The aggregation service 112 may also create graphs to make available for display using the interface component 104 of FIG. 1. The graphs may display the performance characteristics in tabular format. The performance characteristics may also be displayed on the network topology representation. In some aspects, the performance and health characteristics may be overlaid on the network topology by the use of different colors, textures or other User Interface (UI) visualization elements for different link health or performance indications.

At block 406, the aggregation service 112 performs failure detection. Using the network topology gathered at block 302 of the control and collection service routine 300, the aggregation service 112 may iterate through all the links in the network topology in order to compute a percentage of links and nodes which indicate a failure. The links and nodes may be sorted by failure percentage in order to isolate a link or node experiencing performance issues such as packet latency or loss, jitter, or the like. A search may be performed on the network topology for nodes around a failing link. Connected failures may be found to be due to common failing nodes. Block 302 of the control and collection service routine 300 may also be repeated if failures are detected at block 406.

At block 408, the aggregation service performs statistical analysis on the aggregated data to determine the root cause of the detected failures. Candidate failures may be fully determined by the inference process leading to a root cause candidate, or otherwise the aggregation service may perform additional queries or analysis to isolate root causes of failures. In some aspects, the aggregation service 112 may also use additional information from the network, including the external data source(s) 140. For example, information collected by the devices, such as, for example Simple Network Management Protocol (SNMP) data, information from syslogs on the nodes, information from Terminal Access Controller Access-Control System (TACACS), and Change Management (CM) logs may be used to perform root cause analysis. Change Management logs may be used in managing and tracking changes to physical and logical configurations of network devices, links, and other services running in a data center. In various scenarios, the root cause of a failure may be isolated to be related to a power device failure, or to a network device, cabling or transceiver failure. In some embodiments, the cause may be attributable to multiple simultaneous events.

In some embodiments, root cause analysis may be performed by developing a set of equations given a performance indication across a path in order to solve for the performance indication for each link and node in the path. For example, one indication of performance may be latency. Latency includes the latency across a link connecting two nodes, as well as the latency of processing the network packets on each of the endpoint nodes. The total latency across a path may be equated to the sum of the latencies of each node on the path of a packet, and the latencies of each link on that path. Each value of latency may be an integer, or it may be represented by a statistical distribution aggregated from several sample measurements. By using the latencies across all paths for which data is aggregated, the latency of each node and each link may be solved for by solving the set of equations. Once an indication of the latency at each node and each link is known, it is possible to determine the root cause of failure by isolating the faulty link and/or node.

In order to perform efficient root cause analysis, data for enough different paths needs to be collected, as indicated above. As the size of the network grows, the set of equations to be solved for becomes increasingly more complex. As information for more paths is collected, it becomes easier to isolate a link or a node in the network associated with a failure. Some other indications of performance may be packet loss, jitter, available bandwidth, and the like. In some embodiments, packet loss may be determined to be a threshold value of latency. For example, latencies over 100 ms may be considered to be packet losses. In other embodiments, latencies over different values may be considered to be packet losses. In some embodiments, the triangulation may include assigning a confidence level to the finding of a faulty node or link.

After the candidate cause analysis, there may optionally be potential scenarios of failure identified, along with an indication of the likelihood of each scenario (not shown in FIG. 4). For example, once it is determined that a specific node is the cause of failure, it may be posited that the node has a disconnected cable, or that the node has a memory overflow. It may further be posited that it is eighty percent likely that the cable is disconnected, and twenty percent likely that the memory has overflown. Blocks 406 and 408 are described in further detail in connection with the routine 700 illustrated in FIG. 7.

At block 410, the aggregation service develops remediation and alarming strategies. Remediation and alarming may take on several different forms in various embodiments. Before remediation and alarming is performed, there may be validation of the identified failure in order to ensure that it is a failure for which a remediation and/or alarming strategy is known, and/or still required. In some embodiments, remediation may include shutting down a node which is known, with a high level of confidence, to be faulty. In some embodiments, the remediation may include ensuring that packets are not routed through the faulty link or node. In some embodiments, remediation may include disabling ports on a given node. In some embodiments, alarming may include sending an engineer or technician to have a look at the node or link identified to be faulty. In some embodiments, power to a node may be cycled. The power cycle of the node may be done after packets have been routed away from the device, or it may also be done as a fallback mechanism.

Figure 5:
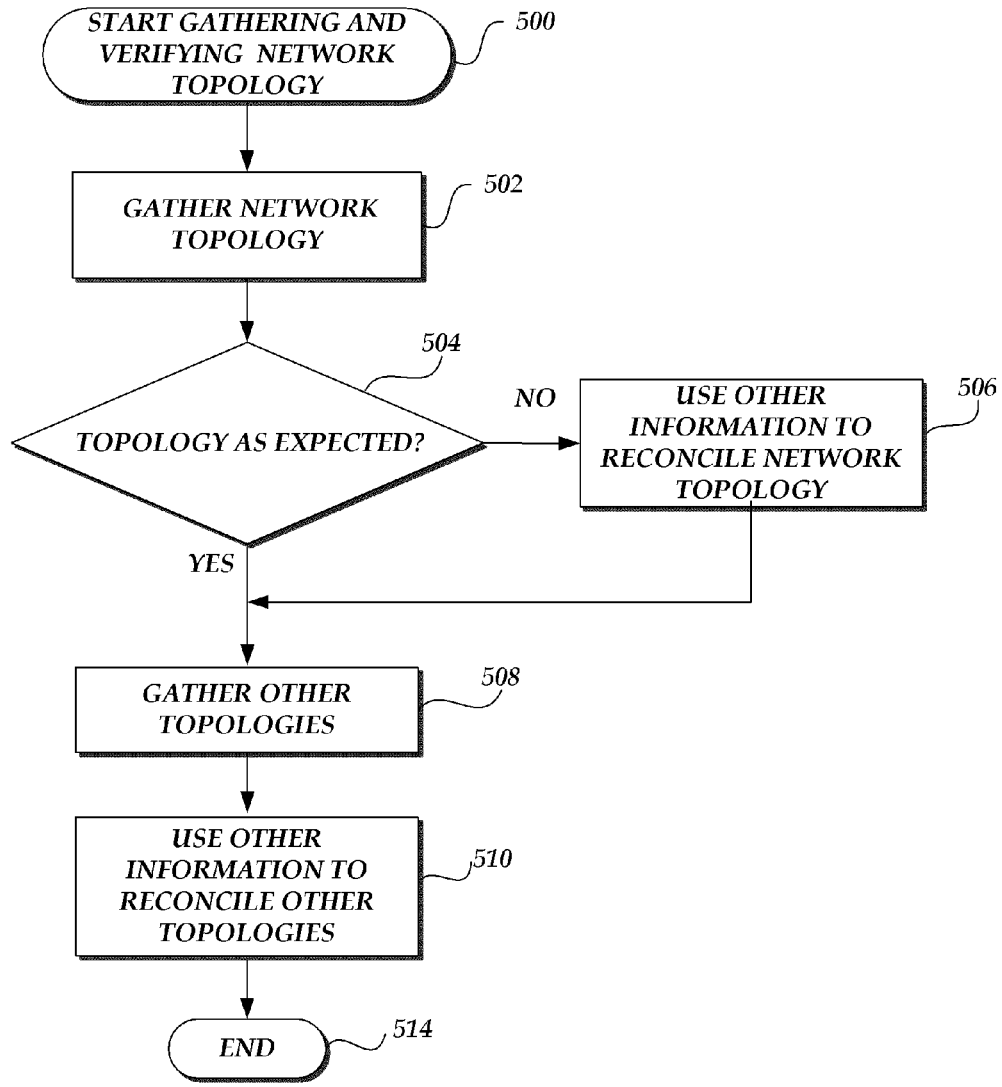
FIG. 5 is a flow diagram depicting an illustrative routine for gathering and verifying network topology.

FIG. 5 is a flow diagram depicting an illustrative routine 500 for gathering and verifying network topology. The routine 500 represents details of what occurs at block 302 of FIG. 3. One skilled in the relevant art will appreciate that actions/steps outlined for routine 500 may be implemented by one or many computing devices/components that are associated with the control and collection service 110 of the data processing component 108 of the network path monitoring and cause of failure detection system 102. Accordingly, the routine has been logically associated as being generally performed by the control and collection service 110 of the data processing component 108, and thus the following illustrative embodiments would not be considered as limiting.

At block 502, the control and collection service 110 gathers a network topology. A network may include a set of nodes and links, which are interconnections between pairs of nodes. Packets traverse through the network along paths. A path may include a sequence of links which indicate the transmission route when a packet travels between nodes within the network.

Data transferred between the nodes may be controlled by several different protocols, with each protocol fulfilling a particular need. For example, the Transmission Control Protocol (TCP) may guarantee reliable and in-order delivery of data from a sender to receiver. Open Shortest Path First (OSPF) is an adaptive routing protocol for Internet Protocol (IP) networks which uses a link state routing algorithm. The link-state protocol is performed by every switching node in the network (i.e. nodes that are prepared to forward packets). With link-state routing, each node constructs a map of the connectivity to the network, in the form of a graph, showing which nodes are connected to which other nodes. Each node then independently calculates the next best logical path from it to every possible destination in the network. The collection of best paths will then form the node's routing table. The control and collection service 110 may thus use information on each node's routing table in order to create the network topology.

At block 504, the control and collection service 110 verifies to see whether the topology created based on the nodes' routing tables is the topology expected. The topology expected may be based on diagrams provided by network technicians. The diagrams provided may also be associated with various confidence levels. The expected topology may also be based on a knowledge of the workflow of the build process for the network. For example, it may be known that the network was initially designed with a 100 nodes, and there was a planned expansion of a doubling of nodes in a given timeframe within a given geographic area. The topology may also be inferred from a combination of external sources, such as configuration files, technicians' information, automated switch building, subnet analysis, SNMP query information regarding run-time configuration states of devices, or other monitoring services. The topology of the network is gathered and stored, and it may be made available for display. If the topology gathered at block 502 is as expected, the routine then moves to block 508. However, if the topology is not as expected, the control and collection service 110 uses the other information available, in order to reconcile the topology at block 506.

In some embodiments, it may be most desirable to track network topologies at Layer 3 of the Open Systems Interconnection (OSI) standard, such as the Internet Protocol (IP). However, topologies of other OSI layers, for example Layer 2 such as Ethernet, as well as other data center topologies, such as for power to racks, power to hosts, power to network devices, and others, may also be desired to be gathered at block 508. A topology may also be created for a physical location within a thermal zone, a room, a data center, or another physical locality. The topologies thus created may be used to correlate with failures detected at block 406. If other topologies are gathered, the control and collection service reconciles information gathered from the external sources with those other layers and topologies at block 510. Various embodiments may be widely applicable to any networking protocol suite or layer and are not restricted to Layer 2 or 3, IP, Ethernet or the Internet Protocol Suite.

Figure 6:
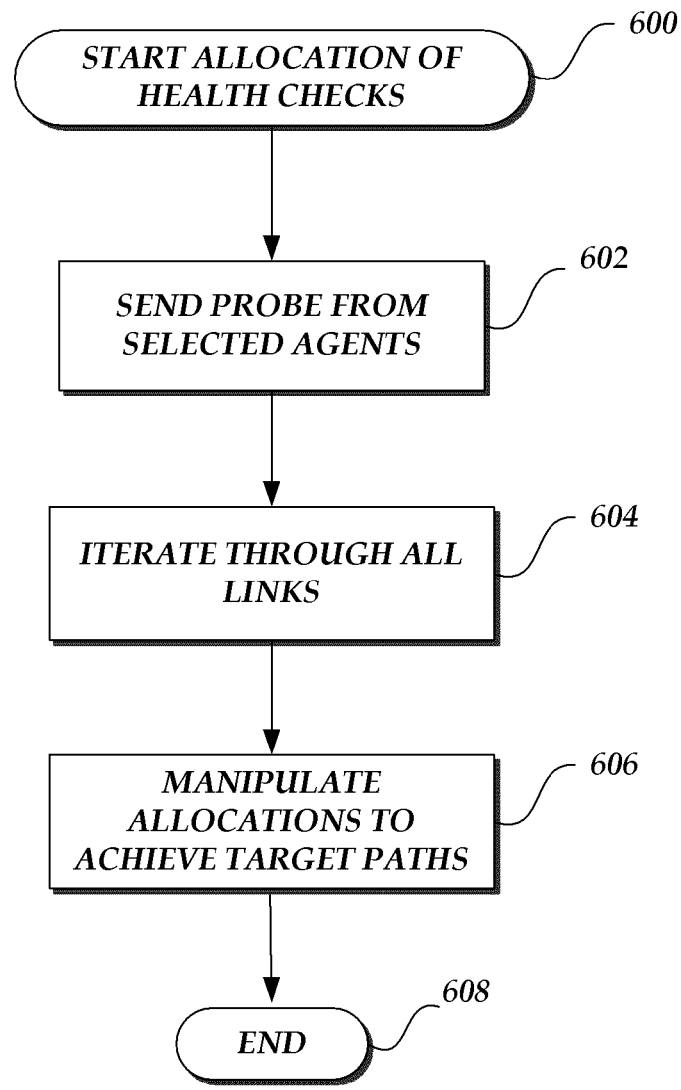
FIG. 6 is a flow diagram depicting an illustrative routine for allocating health checks across a network.

FIG. 6 is a flow diagram depicting an illustrative routine for allocating health checks across a network. The strategy for allocating health checks across a network includes an iteration through all the links in a network in order to meet a number of predetermined constraints. Examples of such constraints may include, for example, a minimum number of paths per link, or a maximum number of paths per link. The routine 600 represents details of an example of what occurs at block 304 of FIG. 3. In order to achieve a desired allocation coverage, network data may be simulated by sending probes from select agents in the network. As illustrated in FIG. 6, at block 602, probes, such as for example UDP packets, are sent from selected agents in the network to all other nodes in the network. In some embodiments, including large complex networks, the network path monitoring and cause of failure detection system 102 does not require each node in the network to act as a transmitter of probes. The network may have a low number of such transmitters. Accordingly, the number of transmitters selected may be a percentage of the number of nodes. The selection may be made by balancing considerations of precision, performance and load on each transmitter or other statistical criteria. The network path monitoring and cause of failure detection system 102 can get full link coverage across all nodes in the network by using a low number of such transmitters. Selecting a larger number of transmitters allows to compensate for any faulty transmitters and for redundant links to the transmitters.

As described above, transmitting a message with UDP packets instead of ICMP packets provides the added advantage of being able to manipulate paths between two endpoints by manipulating port numbers. It may be desired to throttle the frequency of health checks to manage the load generated on network links. However, a minimum number of health checks are necessary for adequate coverage and monitoring of the network. In order to accurately measure packet drops on links to nodes, each node is tested for reachability at an ideal frequency designed to keep the amount of data generated by the transmission of the messages to a workable level while accurately measuring packet loss. In some embodiments, a health check may be initiated every 100 milliseconds, or every 500 milliseconds, or every 5 seconds, or every 5 minutes, or other any other suitable period of time according to business and/or other requirements of the network supported service.

At block 604, using the network topology previously gathered, each link in the network is iterated through in order to ensure that at least one path traverses the link. If a path is successfully allocated to a given link, a counter for all links on a path may be incremented by a certain value. If however if a path is not allocated to a link yet, then at block 606, the health check allocation may be adjusted to achieve a desired path until all links achieve a target number of paths per link. In some embodiments, a warning may be issued by the control and collection service to indicate links which are not covered.

Figure 7:
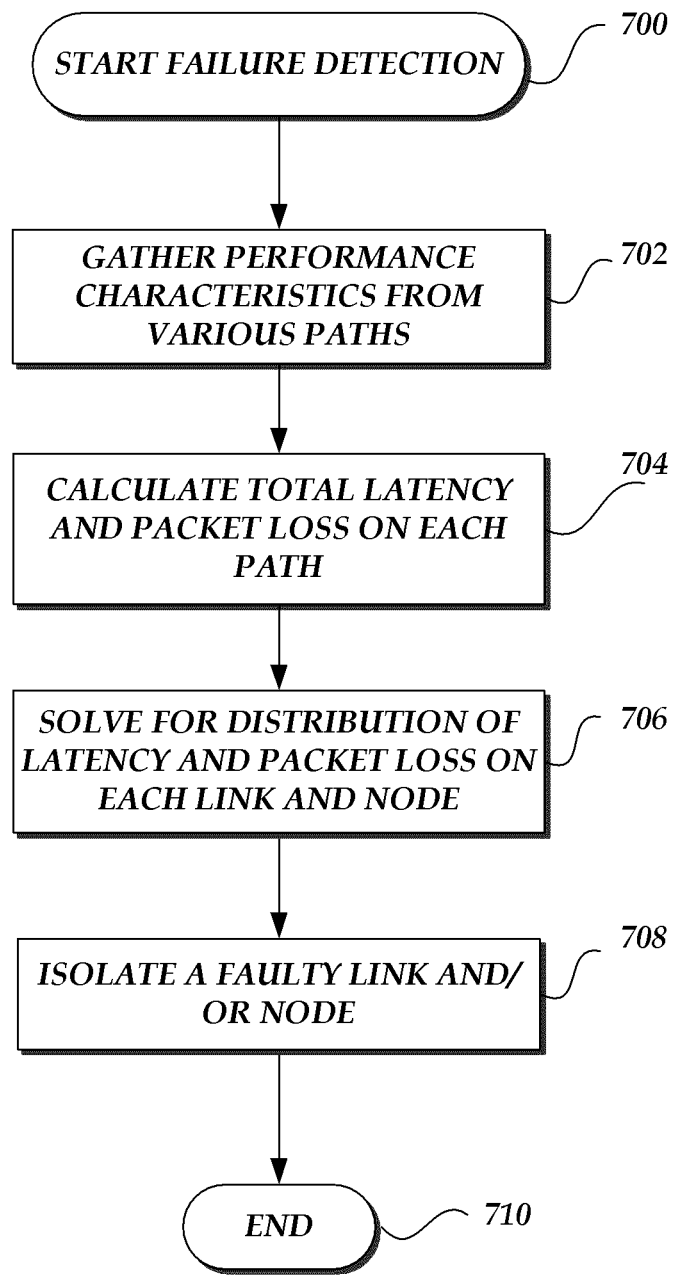
FIG. 7 is a flow diagram depicting an illustrative routine for detecting failures in a network.

FIG. 7 is a flow diagram depicting an illustrative routine for detecting failures in a network. The routine 700 represents details of what occurs at blocks 406 and 408 of FIG. 4. At block 702, the aggregation service gathers performance characteristics collected from various paths. Using the characteristics aggregated, the service develops a set of equations given an indication of performance across a path in order to solve for the performance indications for each link and node in the path. For example, one indication of health may be latency, packet loss, jitter, available bandwidth, and the like. At block 704, the total indication of performance across a path, such as the total latency or the total packet loss, may be equated to the sum of that indication at each node and each link on the path. Latency includes the latency of across a link connecting two nodes, as well as the latency at each of the nodes. The latency of each node may include a delay caused by the processing of the packet at the node. The total latency across a path may be equated to the sum of the latencies of each node on the path of a packet, and the latencies of each link on that path. Each value may be an integer, or it may be represented by a distribution. By using the indications across all paths for which data is aggregated, the health of each node and each link may be solved for by solving the set of equations at block 706. Therefore, in order to perform root cause analysis data for enough different paths needs to be collected. As information for more paths is collected, it becomes easier to isolate a link or a node in the network associated with a failure at block 708.

It will be appreciated by those skilled in the art and others that all of the functions described in this disclosure may be embodied in software executed by one or more processors of the disclosed components and mobile communication devices. The software may be persistently stored in any type of non-volatile storage.

Conditional language, such as, among others, "can," "could," "might," or "may," unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

Any process descriptions, elements, or blocks in the flow diagrams described herein and/or depicted in the attached figures should be understood as potentially representing modules, segments, or portions of code which include one or more executable instructions for implementing specific logical functions or steps in the process. Alternate implementations are included within the scope of the embodiments described herein in which elements or functions may be deleted, executed out of order from that shown or discussed, including substantially concurrently or in reverse order, depending on the functionality involved, as would be understood by those skilled in the art. It will further be appreciated that the data and/or components described above may be stored on a computer-readable medium and loaded into memory of the computing device using a drive mechanism associated with a computer readable storing the computer executable components such as a CD-ROM, DVD-ROM, or network interface further, the component and/or data can be included in a single device or distributed in any manner. Accordingly, general purpose computing devices may be configured to implement the processes, algorithms and methodology of the present disclosure with the processing and/or execution of the various data and/or components described above.

It should be emphasized that many variations and modifications may be made to the above-described embodiments, the elements of which are to be understood as being among other acceptable examples. All such modifications and variations are intended to be included herein within the scope of this disclosure and protected by the following claims.

What is claimed is:

1. A computing device comprising:
    a processing unit in communication with the memory and the interface, the processing unit operative to:
        generate a first network topology comprising a plurality of network paths, wherein each one of the network paths includes at least two nodes and at least one link;
        allocate health checks across the plurality of network paths in order to monitor all links in the network;
        measure communication attributes across each of the plurality of paths in the network by using the generated first network topology, and by manipulating port numbers to modify paths between two nodes;
        process the measured communication attributes for detecting failures on the paths;
        analyze each of the detected failures to determine at least one root cause for each of the failures; and
        remedy the at least one root cause determined;
    a memory that stores at least one of the first network topology, the subsequent network topology, the measured communication attributes, the processed communication attributes, the detected failures, the determined root causes; and
    an interface which makes available for display at least one of the first network topology, the subsequent network topology, the measured communication attributes, the processed communication attributes, the detected failures, the determined root causes and the alarm.

2. The computing device of claim 1, wherein the processing unit is further operative to compare the generated first network topology to an expected topology.

3. The computing device of claim 2, wherein the processing unit is further operative to use an external data source to reconcile the generated first network topology to the expected topology.

4. The computing device of claim 3, wherein the external data source comprises at least one of configuration files, technicians' information, automated switch building, subnet analysis, SNMP query information regarding run-time configuration states of devices, and other monitoring services.

5. The computing device of claim 1, wherein remedying the root cause comprises at least one of generating a subsequent network topology, generating an alarm indicating the root cause, shutting down a faulty node, rerouting packets of data away from the faulty node, disabling ports on the faulty node, cycling power to the faulty node.

6. A computer-implemented method for network path monitoring, the method comprising:
    generating a first network topology comprising a plurality of network paths, wherein each one of the network paths includes at least two nodes and at least one link;
    allocating health checks across the plurality of network paths in order to monitor all links in the network;
    measuring communication attributes across each of the plurality of paths in the network, wherein measuring the communication attributes across each the plurality of paths comprises using the generated first network topology, and manipulating port numbers to modify paths between two nodes;
    processing the measured communication attributes for detecting failures on the paths;
    analyzing each of the detected failures to determine at least one root cause for each of the failures; and
    remedying the at least one root cause determined, wherein remedying comprises at least one of gathering a subsequent network topology, reallocating the health checks, and generating an alarm indicating the root cause.

7. The computer-implemented method of claim 6 further comprising comparing the gathered first network topology to an expected topology.

8. The computer-implemented method of claim 7 further comprising using an external data source to reconcile the gathered first network topology to the expected topology.

9. The computer-implemented method of claim 8, wherein the external data source comprises at least one of configuration files, technicians' information, automated switch building, subnet analysis, SNMP query information regarding run-time configuration states of devices, and other monitoring services.

10. The computer-implemented method of claim 6, wherein the network topology is gathered for layer 3 of the Open Systems Interconnection (OSI) standard.

11. The computer-implemented method of claim 6, further comprising generating a first network topology for layer 2 of the OSI standard.

12. The computer-implemented method of claim 6 further comprising generating a first topology for at least one of: power to racks, power to hosts, and power to network devices.

13. The computer-implemented method of claim 6 further comprising generating a first topology for at least one of a physical location within a thermal zone, a room, and a data center.

14. A non-transitory, computer-readable medium having a computer-executable component, the computer-executable component comprising:
    a network path monitoring component for:
        generating a first network topology comprising a plurality of network paths, wherein each one of the network paths includes at least two nodes and at least one link;
        allocating health checks across the plurality of network paths in order to monitor all links in the network;
        measuring communication attributes across each of the plurality of paths in the network, wherein measuring the communication attributes across each the plurality of paths comprises using the generated first network topology, and manipulating port numbers to modify paths between two nodes; and
        processing the measured communication attributes for detecting failures on the paths.

15. The non-transitory computer-readable medium of claim 14, wherein the network topology is generated for at least one of layer 3 and layer 2 of the Open Systems Interconnection (OSI) standard.

16. The non-transitory computer-readable medium of claim 14, wherein the network path monitoring component is further for:
    comparing the generated first network topology to an expected topology;
    using an external data source to reconcile the generated first network topology to the expected topology.

17. The non-transitory computer-readable medium of claim 16, wherein the external data source comprises at least one of configuration files, technicians' information, automated switch building, subnet analysis, SNMP query information regarding run-time configuration states of devices, and other monitoring services.

* * * * *